United States Patent [19]

Gauggel et al.

[11] Patent Number: 4,576,346
[45] Date of Patent: Mar. 18, 1986

[54] SEEKER HEAD FOR A TARGET SEEKING MISSILE

[75] Inventors: Roland Gauggel, Salem-Grasbeuren; Reiner Eckhardt, überlingen, both of Fed. Rep. of Germany

[73] Assignee: Bodenseewerk Geratetechnic GmbH, Überlingen, Fed. Rep. of Germany

[21] Appl. No.: 608,383

[22] Filed: May 9, 1984

[30] Foreign Application Priority Data

May 11, 1983 [DE] Fed. Rep. of Germany ....... 3317232

[51] Int. Cl.⁴ ............................................. F41G 7/22
[52] U.S. Cl. ................................................. 244/3.16
[58] Field of Search .................... 244/3.15, 3.16, 3.19; 102/213

[56] References Cited

U.S. PATENT DOCUMENTS

| 3,935,818 | 2/1976 | Johnson et al. | 102/213 |
| 3,971,939 | 7/1976 | Andressen | 244/3.16 |
| 4,168,813 | 9/1979 | Pinson et al. | 244/3.15 |

FOREIGN PATENT DOCUMENTS

| 2445488 | 4/1976 | Fed. Rep. of Germany . |
| 1355327 | 6/1974 | United Kingdom . |

Primary Examiner—Charles T. Jordan
Attorney, Agent, or Firm—Lee, Smith & Zickert

[57] ABSTRACT

In a seeker head for a target seeking missile, which comprises a seeker 28 adapted to be directed to a target, two distance sensors 32 and 34 in the form of laser transceiver units are adapted to be directed to the target together with the seeker 28. The arrangement of the distance sensors 32 and 34 on opposite sides of the pitch axis 26 ensures that, with large squint angles, at most one of the distance sensors 32 and 34 is covered.

5 Claims, 2 Drawing Figures

SEEKER HEAD FOR A TARGET SEEKING MISSILE

The invention relates to a seeker head for a target seeking missile, which comprises a seeker adapted to be directed to a target.

Such a seeker head is for example known from UK patent publication no. 1 355 327. In the prior art seeker head the seeker comprises an imaging optical system, which is mounted on a part suspended on gimbals in the seeker head. The imaging optical system forms a field of view in the plane of a reticle appropriately patterned. A missile-fixed detector is located behind the reticle, which is exposed to the radiation from the field of view. The gimbal suspended part rotates with high angular speed about an axis extending essentially in the longitudinal direction of the missile, and thus forms a gyro together with the components of the optical system, which gyro is largely decoupled from the missile movements. The rotating, gimbal suspended part comprises a magnet having radial magnetization. A missile-fixed coil is arranged about the rotating part. The signals from the photoelectric detector are applied to the coil with high gain and depend on the size and the direction of the target deviation. They generate torques on the rotating body by electromagnetic interaction of the coil and the magnet, whereby the optical axis is aligned to the target due to the precession motion of the body.

Other seekers are also known, for example seekers of the type, in which a field of view is observed pointwise by a raster of photoelectric detectors or by a series of detectors in combination with an oscillating mirror, and a target deviation signal is generated from the thus obtained informations. The target deivation signal aligns the seeker to the target, the seeker being decoupled from the movements of the missile by a gimbal suspension.

In case of highly maneuverable air targets, a direct hit is very difficult to obtain. Therefore, in prior art target seeking missiles having a warhead, approach sensors are provided, by which the warhead is fired when the target is located within a certain distance area from the missile. The warhead is also fired when the missile passes the target at a short distance. In prior art missiles, such approach sensors are usually arranged in the cylindrical portion of the body, that is behind the seeker head and behind or in front of the warhead, and form an autonomous unit of the missile. Passive approach sensors can respond to the infrared radiation of the target and detect hot portions of the target, for example the hot engine nozzle. There are also passive approach sensors, which due to their signal evaluation repond to substantial variations of the received intensity of radiation when passing a missile from behind, the approach sensor "sees" first portions of the exhaust gas radiation and then portions of the engine nozzle. Finally the received intersity of radiation decreases considerably when the approach sensor detects the relatively cold airframe. This character of the intensity of radiation gives a criterion for a passage of the target and causes a firing signal to be triggered by evaluation of the signal of the approach sensor.

The detectors observe through an optical system each a sectoral area perpendicular to the missile with a small opening angle in the direction of flight.

Active approach sensors transmit radar or infrared rays and receive the energy reflected from the target. Laser diodes are used as transmitters in the infrared wave range. It can be determined, whether the target is passed at a short distance, by measuring the reflected energy, by measuring the time of transit of pulses being emitted and received back or by the geometrical relative arrangement of the transmitter and the receiver. Also here the distance is measured essentially perpendicularly to the longitudinal axis of the missile because of the required optical system.

The observation perpendicular to the longitudinal axis of the missile suffers from the disadvantage that the approach sensor detects the target only momentarily when passing the target. It has no possibility to watch the approach of the target before, during a (relatively) long time interval. The prior art arrangements can be influenced by interference targets such as clouds. In an active approach sensor operating with radar, an antenna can also emit forward and receive radiation reflected from the front, which antenna is mounted laterally and does not extend out of the body contour. With such an antenna characteristic it is possible to measure the distance to the target from some hundred meters with pulse operation. Furthermore, the approach rate can be measured through Doppler's effect. The firing moment can be determined in advance from the distance and the approach rate. A favorable firing moment can also be found from the approach rate only according to another prior art method.

An approach sensor operating with radar is expensive and is easily subject to interference.

It is the object of the invention, in a missile having an approach sensor, to reduce the expenditure for the approach sensor, to reduce the susceptibility to interference due to disturbing targets such as clouds, and to vary the firing moment depending on the encounter situation.

According to the invention this object is achieved by a seeker head, which comprises a seeker adapted to be aligned to a target, in that a distance sensor is arranged in the seeker head and adapted to be directed to the target together with the seeker.

Such a distance sensor is directed forwards to the target and is caused to follow the target continuously by means of the seeker. Thus, it permits observation of the distance and the variation of the distance even at a long distance of the target, in contrast to the distance sensors which observe a field of view transversely of the longitudinal axis of the missile. The distance sensor practically cannot be affected by disturbing targets, as the distance sensor, because of the seeker, continuously observes the pursued target. The power of the transmitter portion of the distance sensor can be selected at a lower level, as the transmitter has to transmit in a relatively small solid angle only. A receiver of the distance sensor has to detect a small solid angle only around the target and thus receives less background radiation. With the same power of the distance sensor the working range is improved.

Modifications of the invention are subject matter of the sub-claims.

An embodiment of the invention will now be described in greater detail with reference to the accompanying drawings.

Figure 1:
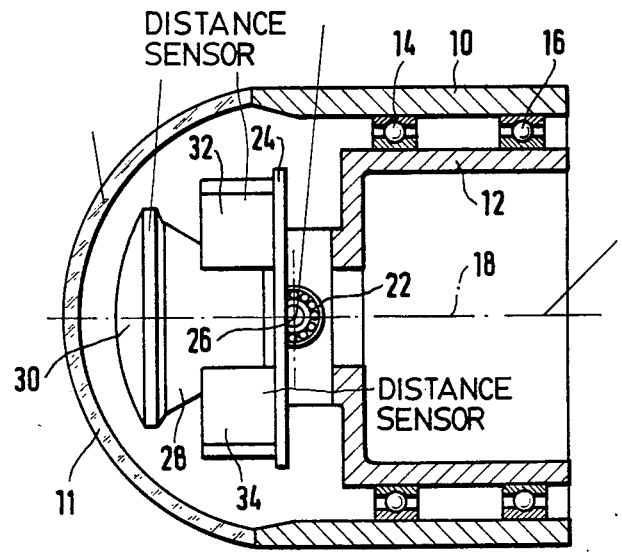
FIG. 1 shows a longitudinal section through a seeker head.
Figure 2:
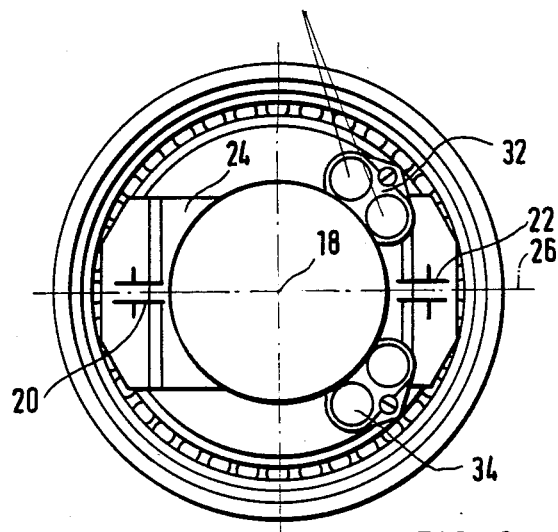
FIG. 2 is a front view of the seeker head as viewed from the left in FIG. 1.

Numeral 10 designates a seeker head, which forms the tip of a missile. The missile can be a target seeking air-to-air rocket. The seeker head is closed by a dome 11.

In the seeker head 10 a roll gimbal 12 is rotatably mounted in bearings 14,16 about a roll axis 18 extending essentially in the longitudinal direction of the missile. On the roll gimbal 12 a part 24 is pivotably mounted in bearings 20,22 about a pitch axis 26 extending crosswise relative to the roll axis 18. Thus, the part 24 forms a pitch gimbal. The part 24 carries the seeker 28 having a seeking optical system 30. The seeker 28 supplies target deviation signals, which control rotational movements of the roll gimbal 12 about the roll axis 18 and of the part 24 about the pitch axis 26, such that the optical axis of the seeker 28 points to the target and permanently follows the target.

A distance sensor 32 is arranged in the seeker head 10, and is adapted to be directed to the target together with the seeker 28. This distance sensor 32 is a laser transceiver unit. It consists of a laser as transmitter, which transmits a closely directional light beam in the infrared. The energy reflected from the target is intercepted by a receiver, which is arranged close to the transmitter. The time of transit of pulsed light beams can serve as a measure of the distance. Furthermore, the received energy itself can be indicative of the distance to the target. Such laser transceiver units are known per se and are therefore not described here in detail.

The distance sensor 32 is mounted on the part 24 beside the seeker 28. With a large squint angle of the seeker 28, that is when the portion 24 is pivoted by a large angle about the pitch axis 26, the distance sensor 32 can be covered completely or partially by the wall of the seeker head 10 or the like. Then it does not provide any useful measure of the distance. To avoid this effect, several distance sensors 32 and 34 are angularly offset about the optical axis of the seeker 28 on the part 24, which carries the seeker 28 and which is adapted to be directed to the target. Thus, when one distance sensor, for example 32, is covered due to tilting of the part 24, it is ensured that, at any rate, another distance sensor 34 arranged on the opposite side is not covered and can fulfil its function. In a seeker head of the type described with the roll gimbal 12 and the part 24 pivotable about the pitch axis 26, two distance sensors 32 and 34 are sufficient, which are arranged on opposite sides of the pitch axis 26, on the part 24 adapted to be aligned.

We claim:

1. Seeker head for a target seeking missile, which comprises a seeker adapted to be directed to a target, characterized in that several distance sensors (32,34) are angularly spaced about the optical axis of the seeker (28) on a part (24) in the seeker head (10), the seeker (28) being mounted on said part (24), and said part (24) being adapted to be directd to the target together with the seeker (28).

2. Seeker head as set forth in claim 1, characterized in that each distance sensor (32,34) is a laser transceiver unit.

3. Seeker head as set forth in claim 1, characterized, in that
   (a) a roll gimbal (12) is rotatably mounted relative to the missile about a roll axis (18) extending essentially in the longitudinal direction of the missile,
   (b) the part (24) adapted to be directed to the target together with the seeker (28) is pivotably mounted on the roll gimbal (12) about a pitch axis (26) extending crosswise relative to the roll axis (18), and
   (c) the two distance sensors (32,34) are arranged on opposite sides of the pitch axis (26).

4. Seeker head as set forth in claim 2, characterized in that several distance sensors (32,34) are angularly spaced about the optical axis of the seeker (28) on a part (24), which carries the seeker (28) and which is adapted to be directed to the target.

5. Seeker head as set forth in claim 4, characterized, in that
   (a) a roll gimbal (12) is rotatably mounted relative to the missile about a roll axis (18) extending essentially in the longitudinal direction of the missile,
   (b) the part (24) adapted to be directed to the target together with the seeker (28) is pivotably mounted on the roll gimbal (12) about a pitch axis (26) extending crosswise relative to the roll axis (18), and
   (c) the two distance sensors (32,34), are arranged on opposite sides of the pitch axis (26).

* * * * *